(12) United States Patent
Naganuma et al.

(10) Patent No.: US 10,082,406 B2
(45) Date of Patent: Sep. 25, 2018

(54) MAGNETIC FIELD DETECTION APPARATUS AND ROTATION DETECTION APPARATUS

(71) Applicant: TDK Corporation, Tokyo (JP)

(72) Inventors: Hiroshi Naganuma, Tokyo (JP); Yohei Hirota, Tokyo (JP); Kunihiro Ueda, Tokyo (JP)

(73) Assignee: TDK Corporation, Tokyo (JP)

( * ) Notice: Subject to any disclaimer, the term of this patent is extended or adjusted under 35 U.S.C. 154(b) by 77 days.

(21) Appl. No.: 15/234,042

(22) Filed: Aug. 11, 2016

(65) Prior Publication Data

US 2017/0059362 A1 Mar. 2, 2017

(30) Foreign Application Priority Data

Sep. 2, 2015 (JP) .................................. 2015-172723

(51) Int. Cl.
*G01D 5/16* (2006.01)
*G01D 5/14* (2006.01)

(52) U.S. Cl.
CPC .............. *G01D 5/16* (2013.01); *G01D 5/147* (2013.01)

(58) Field of Classification Search
CPC .......... G01D 5/16; G01D 5/147; G01D 5/145; G01D 11/245; G01D 5/2451; G01D 5/00; G01P 3/487
See application file for complete search history.

(56) References Cited

U.S. PATENT DOCUMENTS

| 5,210,489 A | * | 5/1993 | Petersen | ................... G01V 3/08 |
| | | | | 324/174 |
| 8,080,993 B2 | | 12/2011 | Theuss et al. | |
| 2011/0267043 A1 | * | 11/2011 | Dolsak | ................. G01D 5/2455 |
| | | | | 324/207.11 |
| 2011/0291645 A1 | * | 12/2011 | Franke | ................... G01D 5/145 |
| | | | | 324/207.2 |

FOREIGN PATENT DOCUMENTS

| JP | H04-232470 A | 8/1992 |
| JP | H08-320327 A | 12/1996 |
| JP | H11-183498 A | 7/1999 |

OTHER PUBLICATIONS

Office Action dated Jun. 6, 2017 issued in corresponding JP patent application No. 2015172723 (English translation only).

* cited by examiner

Primary Examiner — Jermele M Hollington
Assistant Examiner — Suresh K Rajaputra
(74) Attorney, Agent, or Firm — Posz Law Group, PLC

(57) ABSTRACT

A magnetic field detection apparatus has a first magnetic sensor and a bias magnet positioned to face the first magnetic sensor. The bias magnet has a magnetic pole surface that faces the first magnetic sensor and that applies a bias magnetic field to the first magnetic sensor. The first magnetic sensor detects magnetic field in a first direction that is parallel to the magnetic pole surface. The magnetic pole surface of the bias magnet has a plurality of grooves arranged in the first direction.

13 Claims, 12 Drawing Sheets

MAGNETIC FIELD DETECTION APPARATUS AND ROTATION DETECTION APPARATUS

BACKGROUND OF THE INVENTION

1. Field of Invention

The present invention relates to a magnetic field detection apparatus and a rotation detection apparatus that includes the same. The present invention particularly relates to the configuration of the bias magnet of the magnetic field detection apparatus.

2. Description of the Related Art

An assembly that is made up of a magnetic field detection apparatus and a gear has been conventionally recognized as an example of rotation detection apparatuses for rotary devices that are used in the field of automobiles or the like. The magnetic field detection apparatus includes a magnetic sensor. The magnetic sensor generally has a magneto-resistive effect element that utilizes the magneto-resistive effect. A gear that is made of a magnetic material and that is connected to the rotary device is provided on the front side of the magnetic sensor. A bias magnet that applies a bias magnetic field to the magneto-resistive effect element is provided on the backside of the magnetic sensor. One of the two magnetic pole surfaces of the bias magnet (N pole surface) faces the magnetic sensor. The bias magnetic field is drawn toward a tooth of the rotating gear and the direction of the bias magnetic field is periodically changed. In other words, as the gear rotates, the component of the bias magnetic field that is parallel to the magnetic pole surface is periodically changed. The magnetic sensor detects the rotation of the gear by detecting the change of this magnetic field component.

The bias magnetic field is generally directed substantially perpendicular to the magnetic pole surface of the bias magnet at the center of the magnetic pole surface, but it is directed outward with respect to a surface perpendicular to the magnetic pole surface as it is farther away from the center. In other words, magnetic lines radiate outwardly from the magnetic pole surface. The component of the bias magnetic field that is parallel to the magnetic pole surface increases at a position away from the center of the magnetic pole surface. It is desirable that the bias magnetic field or the magnetic lines be directed as close as possible to a direction that is perpendicular to the magnetic pole surface of the bias magnet when no magnetic substances, such as a gear, are in the vicinity. In other words, it is desirable that the bias magnetic field have a small component in a direction that is parallel to the magnetic pole surface over a large area.

JP11-183498A and JP8-320327A disclose magnetic field detection apparatuses having two magnetic sensors. A recess is provided on a part of the magnetic pole surface, allowing the bias magnetic field on the front side of the two magnetic sensors to be directed in a direction perpendicular to the magnetic pole surface of a bias magnet. U.S. Pat. No. 8,080,993 discloses a magnetic field detection apparatus that includes a magnetic field guide element provided between a bias magnet and a magnetic sensor. The guide element has a V-shaped recess. The bias magnetic field is directed inward at both side slopes of the recess and is then turned outward. Therefore, the bias magnetic field is directed perpendicular to the magnetic pole surface of the bias magnet at a position where the magnetic field directed inward is turned outward.

SUMMARY OF THE INVENTION

According to the arts described in these patent documents, the component of the bias magnetic field that is parallel to the magnetic pole surface becomes small only in a limited area. Thus, a high accuracy assembly process is required in order to dispose the magnetic sensor in such a limited area, causing an increase in the cost of the magnetic field detection apparatus.

It is an object of the present invention to provide a magnetic field detection apparatus in which the component of a bias magnetic field that is parallel to the magnetic pole surface is reduced over a wide area.

According to an embodiment of the present invention, a magnetic field detection apparatus comprises a first magnetic sensor and a bias magnet positioned to face the first magnetic sensor. The bias magnet has a magnetic pole surface that faces the first magnetic sensor and that applies a bias magnetic field to the first magnetic sensor. The first magnetic sensor detects magnetic field in a first direction that is parallel to the magnetic pole surface. The magnetic pole surface of the bias magnet has a plurality of grooves arranged in the first direction.

The grooves that are provided on the magnetic pole surface of the bias magnet limit or reverse the gradient of the component of the bias magnetic field in the first direction, with respect to the first direction (gradient of Bx, or dBx/dx, illustrated in FIGS. 5B to 11B). Since a plurality of grooves is provided, the component of the bias magnetic field in the first direction can be reduced between the grooves.

Thus, according to the present invention, a magnetic field detection apparatus in which the component of a bias magnetic field that is parallel to the magnetic pole surface is reduced over a wide area can be provided.

DETAILED DESCRIPTION OF EMBODIMENTS

Hereinafter, various embodiments of a magnetic field detection apparatus and a rotation detection apparatus having the magnetic field detection apparatus according to the present invention will be described with reference to the drawings. Although not described here, the magnetic field detection apparatus according to the present invention may also be applied to an apparatus that detects a linear motion, such as a linear encoder. In the description below, a direction which is parallel to the magnetic pole surface of the bias magnet and in which three magnetic sensors are arranged is called a first direction, or an x direction. A direction parallel to the magnetic pole surface of the bias magnet and perpendicular to the x direction is called a second direction, or a y direction. A direction perpendicular to the magnetic pole surface of the bias magnet is called a third direction, or a z direction.

Figure 1:
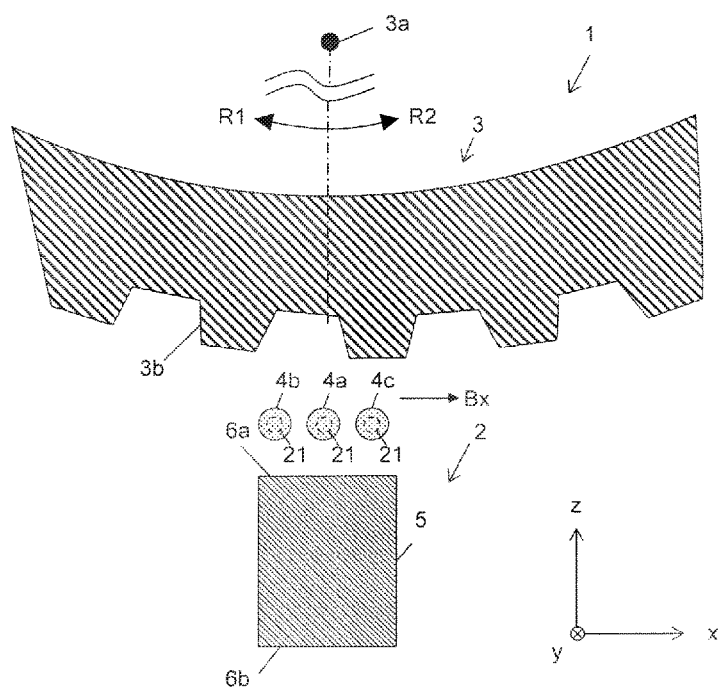
FIG. 1 is a conceptual diagram illustrating a rotation detection apparatus according to an embodiment of the present invention.

FIG. 1 shows a conceptual diagram illustrating rotation detection apparatus 1 according to an embodiment of the present invention. Rotation detection apparatus 1 includes magnetic field detection apparatus 2 and rotatable gear 3 made of a magnetic material, such as metal. Gear 3 is rotatable around rotation axis 3a in clockwise direction R1 and in anticlockwise direction R2. Gear 3 may be a part of a rotary device (not illustrated) or may be connected to a rotary device. Rotation axis 3a of gear 3 extends in a direction that is parallel to the second direction (y direction). Gear 3 has an array of teeth 3b on the outer periphery thereof and teeth 3b protrude at constant intervals.

Magnetic field detection apparatus 2 includes three magnetic sensors 4a, 4b and 4c, and bias magnet 5 (hereinafter, any one of first to third magnetic sensors 4a, 4b and 4c may be referred to as magnetic sensor 4). Magnetic sensors 4a, 4b and 4c are positioned between gear 3 and bias magnet 5. Bias magnet 5 has magnetic pole surface 6a, i.e., the N pole, and magnetic pole surface 6b, i.e., the S pole. One of the magnetic pole surfaces, which is magnetic pole surface 6a (N pole), faces three magnetic sensors 4a, 4b and 4c and applies bias magnetic field to three magnetic sensors 4a, 4b and 4c. Three magnetic sensors 4a, 4b and 4c consist of first magnetic sensor 4a, second magnetic sensor 4b and third magnetic sensor 4c. First to third magnetic sensors 4a, 4b and 4c are arranged in the first direction (x direction) and first magnetic sensor 4a is positioned between second magnetic sensor 4b and third magnetic sensor 4c. First magnetic sensor 4a faces magnetic pole surface 6a of bias magnet 5 at the center of magnetic pole surface 6a with respect to the x direction. The center of magnetic pole surface 6a is synonymous with the middle point of magnetic pole surface 6a in the x direction.

Figure 2:
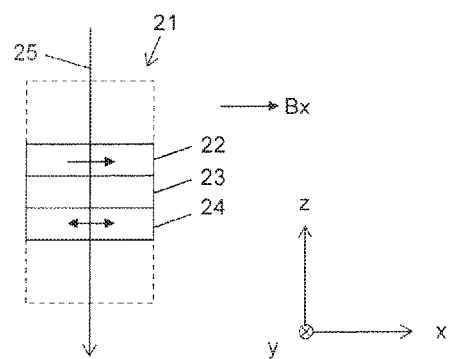
FIG. 2 is a conceptual diagram illustrating the configuration of the magneto-resistive effect element of a magnetic sensor.

First to third magnetic sensors 4a, 4b and 4c have the same configuration. Each of first to third magnetic sensors 4a, 4b and 4c includes magneto-resistive effect element 21, such as a tunnel magneto-resistive (TMR) element that utilizes the magneto-resistive effect. FIG. 2 is a conceptual diagram illustrating a TMR element as an example of magneto-resistive effect element 21. Magneto-resistive effect element 21 has magnetically pinned layer 22 whose magnetization direction is pinned with respect to an external magnetic field, magnetically free layer 24 whose magnetization direction rotates within an x-y plane with respect to the external magnetic field and tunnel barrier layer 23 positioned between magnetically pinned layer 22 and magnetically free layer 24. Sense current 25 flows through layers 22 to 24 in the z direction. Magnetically fixed layer 22 is magnetized in the x direction. The magnetization of magnetically free layer 24 in the x direction changes as the component of the bias magnetic field in the x direction changes, and therefore electric resistance to sense current 25 is changed according to the change of the magnetization of magnetically free layer 24 in the x direction. First to third magnetic sensors 4a, 4b and 4c can detect the component of the magnetic field (magnetic flux density) in the x direction, Bx, based on the change in the resistance value (change in voltage).

Figure 3A:
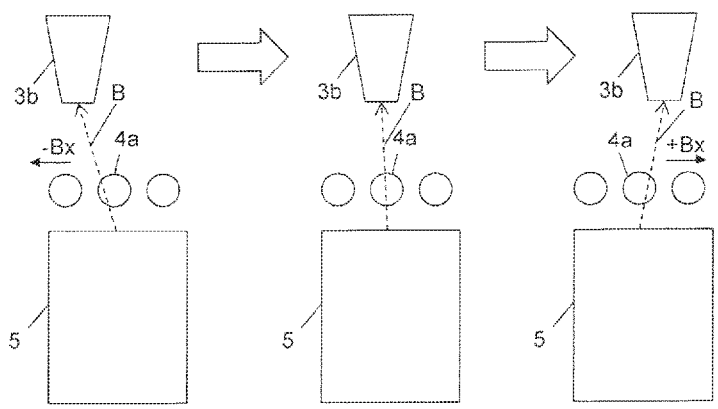
FIGS. 3A to 3D are conceptual diagrams illustrating the operation principle of the rotation detection apparatus.
Figure 3B:
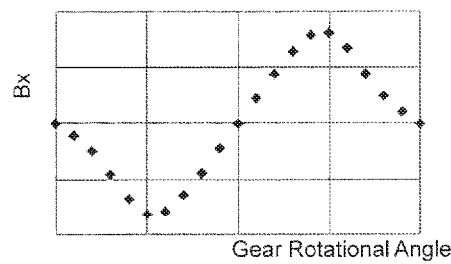
Figure 3C:
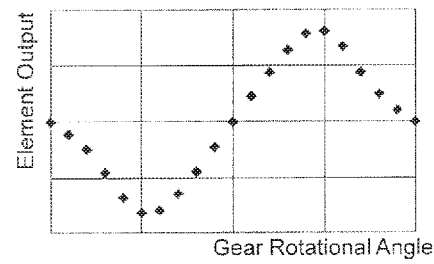
Figure 3D:
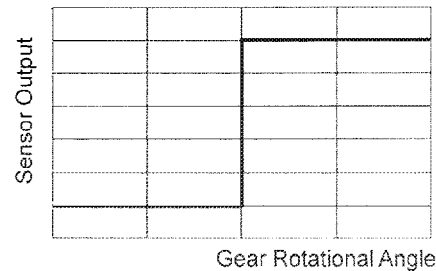

FIGS. 3A to 3D illustrates the operation principle of rotation detection apparatus 1. Suppose that gear 3 rotates in anticlockwise direction R2 and tooth 3b of gear 3 moves rightward relative to bias magnet 5, as illustrated in FIG. 3A. When tooth 3b of gear 3 is positioned on the left side of bias magnet 5, bias magnetic field B that is discharged from bias magnet 5 is drawn leftward by tooth 3b of gear 3. If the sign of Bx is positive in the rightward direction in the drawing, then Bx between bias magnetic field 5 and tooth 3b of gear 3 is negative. When gear 3 rotates to a position where tooth 3b of gear 3 is in front of the center of bias magnet 5 with respect to the x direction, Bx becomes zero. When tooth 3b of gear 3 rotates to the right side of bias magnet 5, Bx becomes positive. Accordingly, when one tooth 3b of gear 3 passes through the front face of bias magnet 5, the change in Bx makes one sinusoidal cycle, as illustrated in FIG. 3B. Since the output of magneto-resistive effect element 21 of magnetic sensor 4 (hereinafter, referred to as element output) is proportional to Bx, the element output makes a waveform similar to that of FIG. 3B, as illustrated in FIG. 3C. Magnetic sensor 4 includes, for example, a comparator (not illustrated) that binarizes the element output, and magnetic sensor 4 outputs binarized voltages that each corresponds to a positive or a negative value of the element output, as illustrated in FIG. 3D. Therefore, a change in voltage enables detecting the passage of one tooth gear 3b of gear 3 through the front face of magnetic sensor 4.

Figure 4A:
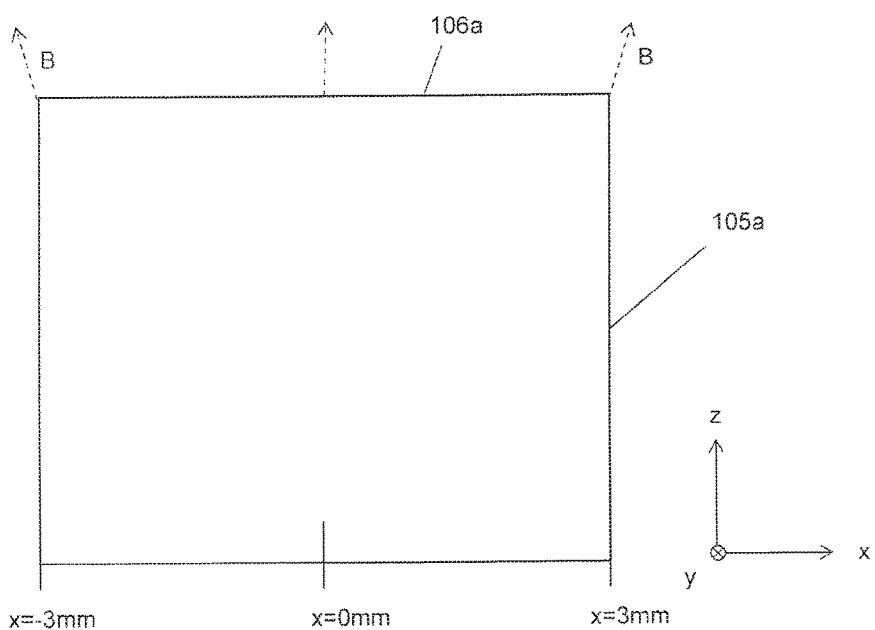
FIGS. 4A to 5B are diagrams illustrating the configuration of conventional bias magnets and magnetic flux density in the x direction.
Figure 4B:
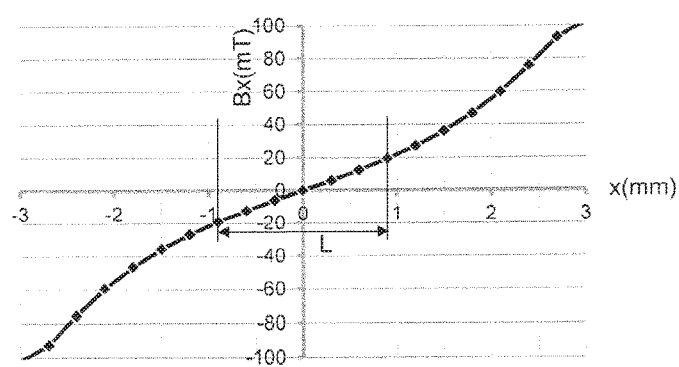
Figure 5A:
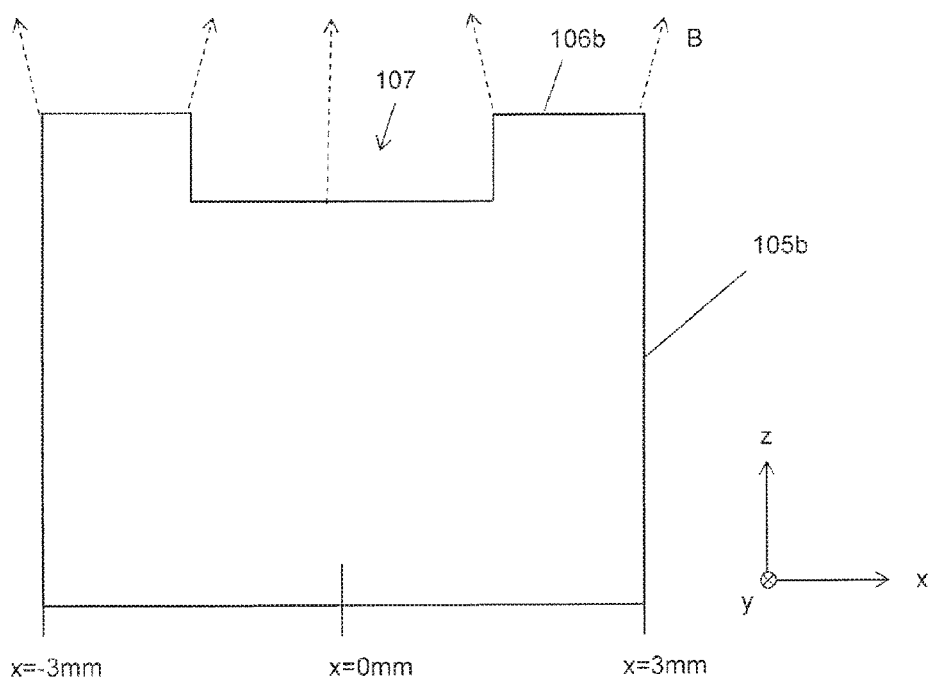
Figure 5B:
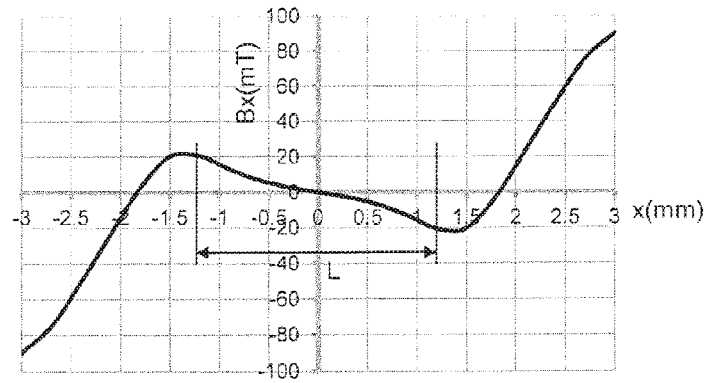

FIGS. 4A to 5B illustrate the configurations of conventional bias magnets and magnetic flux density Bx. Bias magnet 105a illustrated in FIG. 4A has a rectangular parallelepiped shape of 6 mm in the x direction, 4.4 mm in the y direction and 5.5 mm in the z direction. Magnetic pole surface 106a that faces magnetic sensors 4a, 4b and 4c is flat and does not have any uneven pattern. Bias magnet 105b illustrated in FIG. 5A has the same outer dimensions as bias magnet 105a illustrated in FIG. 4A but has one groove 107 formed on magnetic pole surface 106b that faces magnetic sensors 4a, 4b and 4c. FIG. 4B and FIG. 5B illustrate magnetic flux density Bx as a function of the position in the x direction. Magnetic flux density Bx is defined at y=0 mm and z=0.5 mm, wherein y=0 mm corresponds to the center of magnetic pole surface 106a in the y direction and z=0 corresponds to the position of magnetic pole surface 106a.

Referring to FIG. 4B, Bx is zero at x=0 mm (the center of the bias magnet in the x direction) and takes larger positive values as x increases in the positive direction and takes lager negative values as x decreases in the negative direction. This means that magnetic field B (magnetic lines) is directed outward and farther obliquely as bias magnet 105a is positioned farther away from the center (x=0 mm) in the x direction, as indicated by the broken lines in FIG. 4A. The element output of magnetic sensor 4 takes a substantially sinusoidal waveform, as illustrated in FIG. 3C, and ideally takes a symmetrical waveform in the positive and negative directions. However, if, during installation, the position of magnetic sensor 4 is shifted in +x or −x direction from the center in the x direction (x=0 mm), then Bx will not become zero when tooth 3b of gear 3 comes in front of magnetic sensor 4. As the element output fluctuates around the value shifted from Bx=0 (i.e., the graph illustrated in FIG. 3C is shifted upward or downward as a whole), binarization may not be correctly carried out in the worst case.

When a single magnetic sensor 4 is provided, magnetic sensor 4 must be accurately positioned at the center of bias magnet 105a in the x direction, which causes an increase in the cost of magnetic field detection apparatus 2. When a plurality of magnetic sensors is provided, at least one of the magnetic sensors is inevitably shifted from the center of bias magnet 105a in the x direction since it is impossible to position all the magnetic sensors at the center of bias magnet 105a in the x direction. This means that there is a higher possibility that binarization will not be correctly carried out in at least one of the magnetic sensors.

As a solution to the aforementioned problem, fluctuation of Bx with respect to x can be limited by providing one groove 107 on magnetic pole surface 106b, as illustrated in FIG. 5A. Referring to FIG. 5B, Bx has a negative gradient in the range of x where groove 107 is present, and the absolute value of the gradient is slightly smaller than that illustrated in FIG. 4B. In FIG. 4B and FIG. 5B, ranges L of x where the values of Bx are within ±20 mT are shown. Range L in FIG. 5B is wider than that of the rectangular parallelepiped shape having no groove 107 illustrated in FIG. 4A. It should be noted that ranges L within ±20 mT is only an example and may be modified when applied to magnetic field detection apparatus 2.

Figure 6:
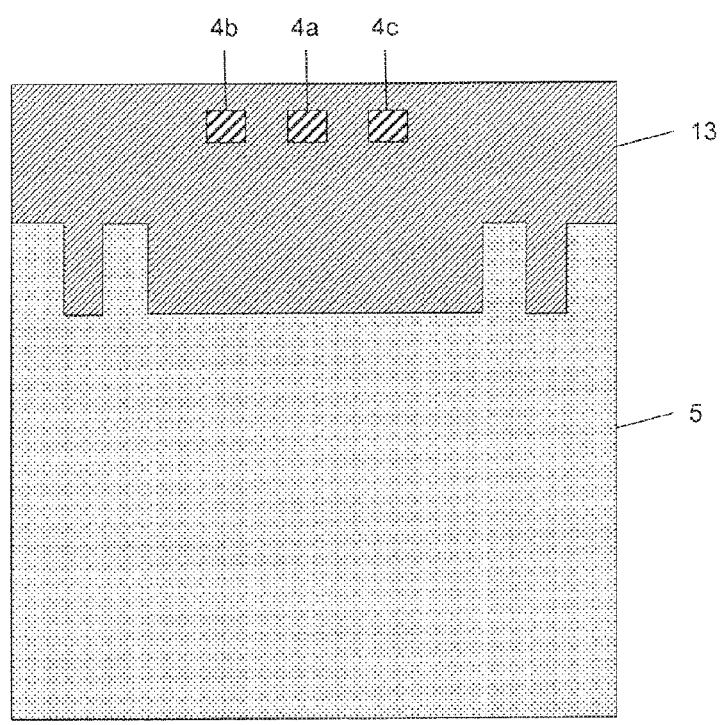
FIG. 6 is a conceptual diagram illustrating magnetic sensors integrated with a bias magnet.

The present invention provides magnetic field detection apparatus 2 that is capable of widening the range of small Bx. For that purpose, magnetic pole surface 6a of bias magnet 5 that faces first to third magnetic sensors 4a, 4b and 4c has a plurality of grooves 7 that are arranged in the x direction (first direction). Each groove 7 penetrates bias magnet 5 in the y direction and has a constant cross section along the y direction. Groove 7 can be formed by cutting bias magnet 5 that has a rectangular parallelepiped shape. As illustrated in FIG. 6, first to third magnetic sensors 4a, 4b and 4c may be integrated with bias magnet 5. First to third magnetic sensors 4a, 4b and 4c are integrated with, for example, holder 13 made of plastic, and holder 13 is integrated with bias magnet 5. First to third magnetic sensors 4a, 4b and 4c are enclosed in holder 13. Bias magnet 5 may be formed by injection molding. A plurality of grooves 7 of bias magnet 5 increases the contact area between grooves 7 and bias magnet 5, allowing holder 13 to be firmly fixed to bias magnet 5. As a result, holder 13 is less likely to fall off from bias magnet 5.

Figure 7A:
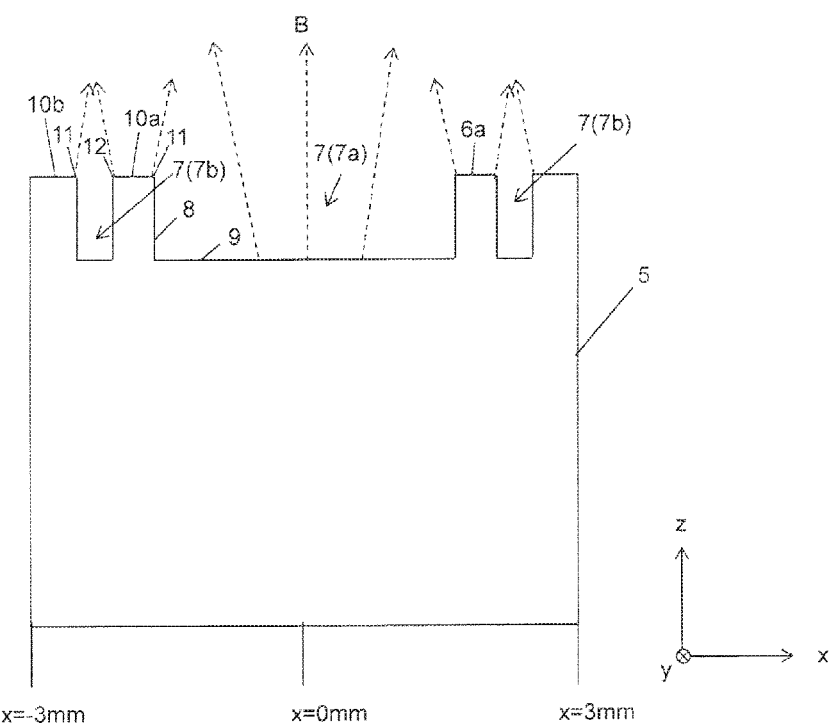
FIGS. 7A to 11B are diagrams illustrating the configurations of the bias magnet according to various embodiments and magnetic flux density in the x direction.
Figure 7B:
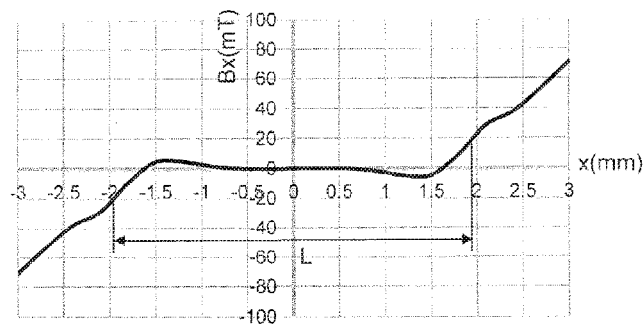

Hereinafter, referring to FIGS. 7A to 12, various embodiments of bias magnet 5 will be described. Bias magnets 5 of the embodiments have outer dimensions of 6 mm in the x direction, 4.4 mm in the y direction and 5.5 mm in the z direction as in the case of the bias magnets illustrated in FIGS. 4A and 5A. FIGS. 7A, 8A, 9A, 10A, 11A and 12 illustrates the external shape of bias magnet 5, and FIGS. 7B, 8B, 9B, 10B and 11B illustrates magnetic flux density Bx at y=0 mm and z=0.5 mm as a function of x, as in FIGS. 4B and 5B. In each embodiment described below, grooves 7 preferably have depths that are half or less than half the dimension of bias magnet 5 in the third direction (z direction). This is partly because the influence on Bx decreases as groove 7 becomes deeper, and partly because, as groove 7 becomes deeper, there is a greater occurrence of disadvantages as regards processing cost or the strength of bias magnet 5. As illustrated in FIG. 7A, the boundary between side wall 8 and bottom 9 of groove 7 may be formed as an intersection of two planes that are perpendicular to each other or may be formed as a curve that smoothly connects side wall 8 of groove 7 to bottom 9 of groove 7. On the other hand, the boundary between side wall 8 of groove 7 and magnetic pole surface 6a is preferably formed as an intersection of two planes that are perpendicular to each other (i.e., as an edge that is bent at right angles).

As illustrated in FIG. 7A, magnetic pole surface 6a of bias magnet 5 has first groove 7a positioned at the center thereof in the x direction and two second grooves 7b that are positioned on both sides of first groove 7a with respect to the first direction (the x direction) and that have the same depths as first groove 7a. "Positioned at the center in the x direction" means that the center line of groove 7a passes through the middle point of magnetic pole surface 6a of bias magnet 5 with respect to the x direction. The two second grooves 7b are preferably arranged at symmetrical positions with respect to the center in the x direction. As can be understood from comparison between FIG. 4B and FIG. 5B, grooves 7 generally have the effect of reducing or reversing the gradient of Bx. This is because the protrusions on both sides of groove 7 have the same characteristics as independent magnetic poles. Specifically, magnetic flux discharged from inner edge 11 of first protrusion 10a between first groove 7a and second groove 7b is directed toward the center, while magnetic flux discharged from outer edge 12 is directed outward. On the other hand, magnetic flux discharged from the center of first groove 7a is perpendicular to bottom 9 of groove 7 and magnetic flux discharged from both sides of first groove 7a are directed outward. Accordingly, magnetic flux discharged from groove 7 near inner edge 11 of first protrusion 10a and magnetic flux discharged from first protrusion 10a cancel each other and limit Bx. Similarly, magnetic flux discharged from outer edge 12 of first protrusion 10a and magnetic flux discharged from inner edge 11 of second protrusion 10b cancel each other and limit Bx near second groove 7b.

Figure 12:
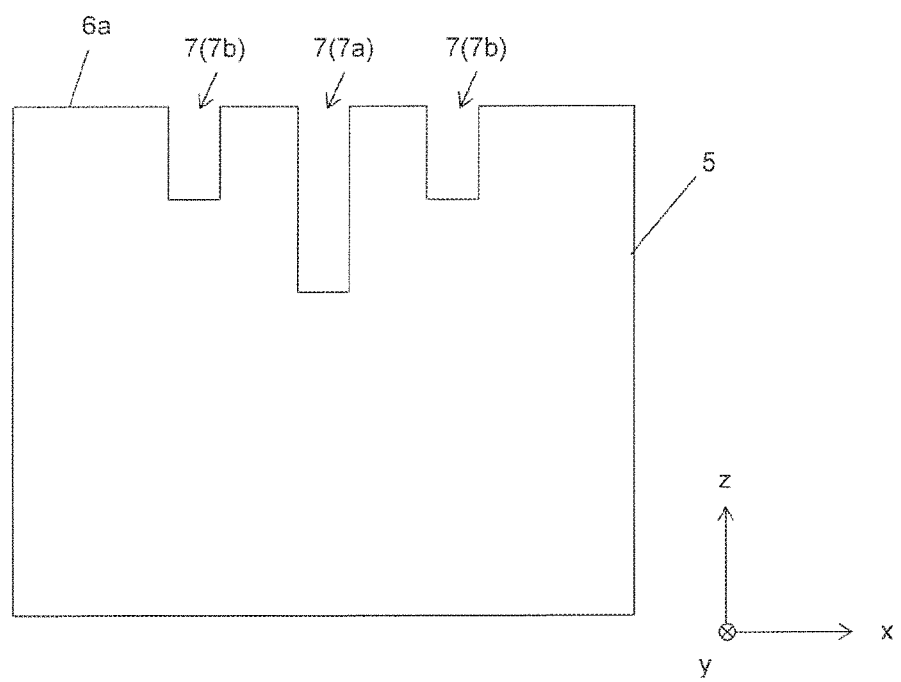
FIG. 12 is a diagram illustrating the configuration of the bias magnet according to another embodiment.

Thus, the positive gradient of Bx is restricted or reversed to negative over a wide range in the x direction due to a plurality of grooves 7 arranged in the x direction, and therefore Bx is made flat. Since first groove 7a has a larger dimension than second groove 7b in the x direction, Bx can be made flat over a wider range. As illustrated in FIG. 12, second groove 7b may also have approximately the same dimension in the x direction as first groove 7a and a smaller depth than first groove 7a.

Figure 8A:
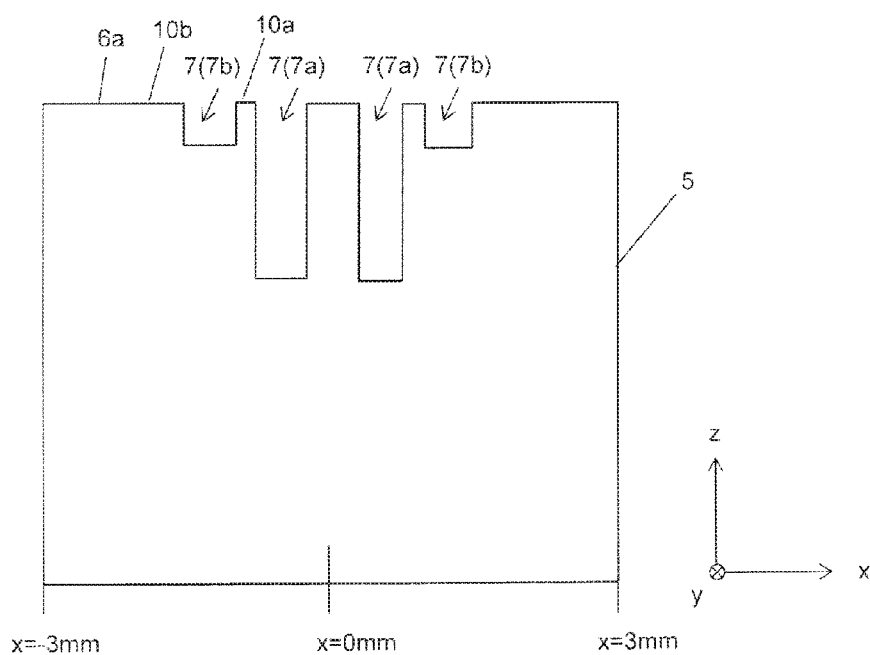
Figure 8B:
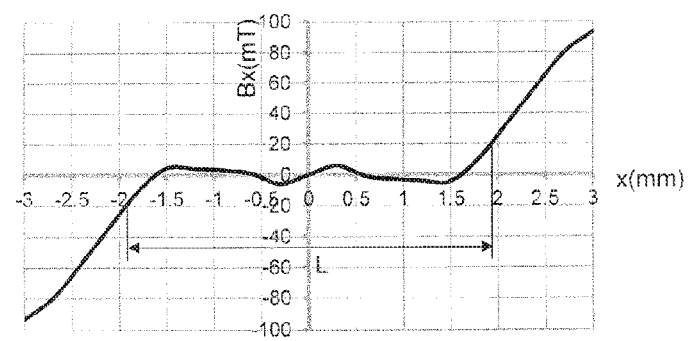

As illustrated in FIG. 8A, bias magnet 5 may have two first grooves 7a positioned on both sides of the center of magnetic pole surface 6a with respect to the x direction (x=0) and two second grooves 7b each positioned outside of first groove 7a with respect to the x direction. In this embodiment, first grooves 7a and second grooves 7b are arranged at symmetrical positions with respect to the center of magnetic pole surface 6a in the x direction, respectively, and second grooves 7b have smaller depths than first grooves 7a. Because of the smaller depths of second grooves 7b, the characteristics of first and second protrusions 10a and 10b on both sides of second groove 7b, as independent magnetic poles, become weaker, thereby facilitating adjustment of the gradient of Bx.

Figure 9A:
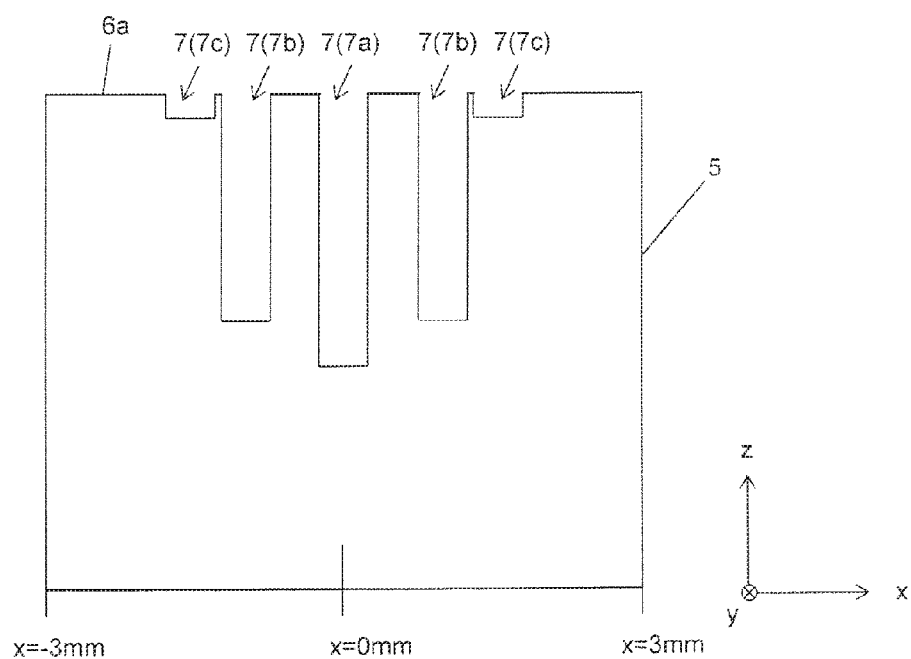
Figure 9B:
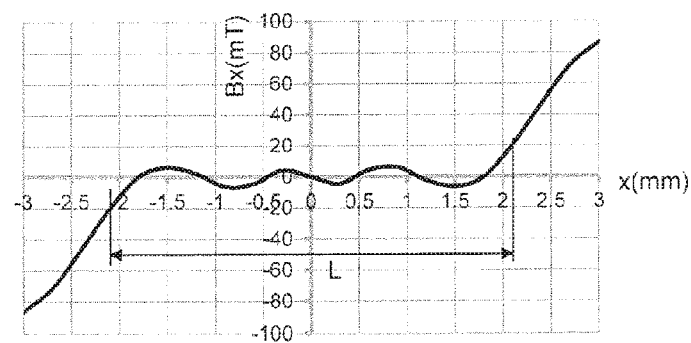
Figure 13:
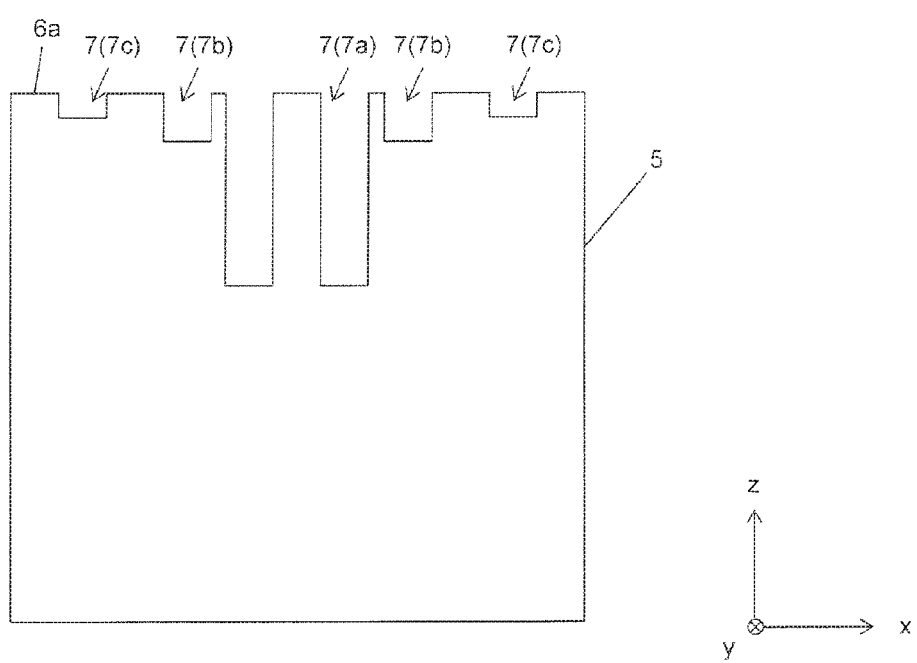
FIG. 13 is a diagram illustrating the configuration of the bias magnet according to another embodiment.

As illustrated in FIG. 9A, bias magnet 5 may have third grooves 7c each positioned outside of second groove 7b with respect to the x direction. In this embodiment, one first groove 7a is provided at the center of magnetic pole surface 6a in the x direction. However, as illustrated in FIG. 13, two first grooves 7a may be arranged at symmetrical positions with respect to the center of magnetic pole surface 6a in the x direction. In both embodiments, third grooves 7c are preferably arranged at symmetrical positions with respect to the center of magnetic pole surface 6a in the x direction. Third grooves 7c are preferably more shallow than second grooves 7b. In addition, although not illustrated, one or more grooves (fourth groove, fifth groove, and the like) may be provided outside of third groove 7c. In that case, any outer groove preferably has a smaller depth than any groove that is located inside of the outer groove, and accordingly Bx can be made flat over a wider range.

Figure 10A:
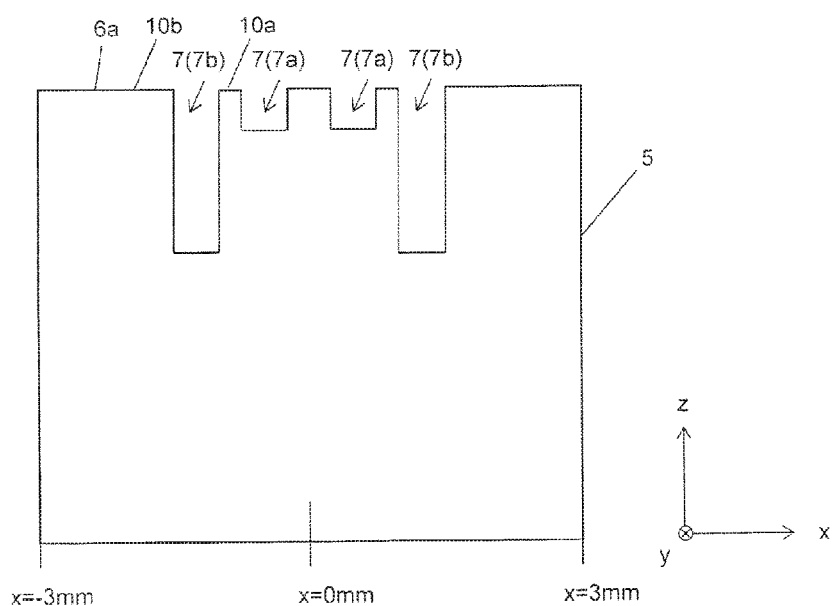
Figure 10B:
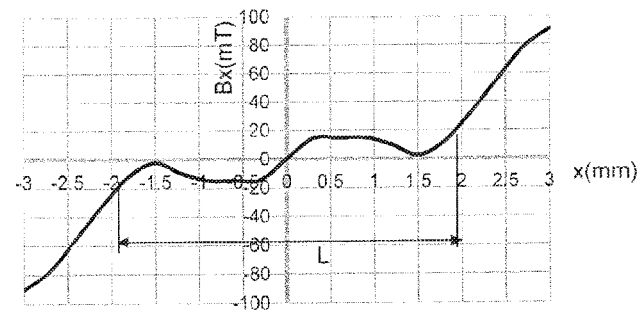
Figure 11A:
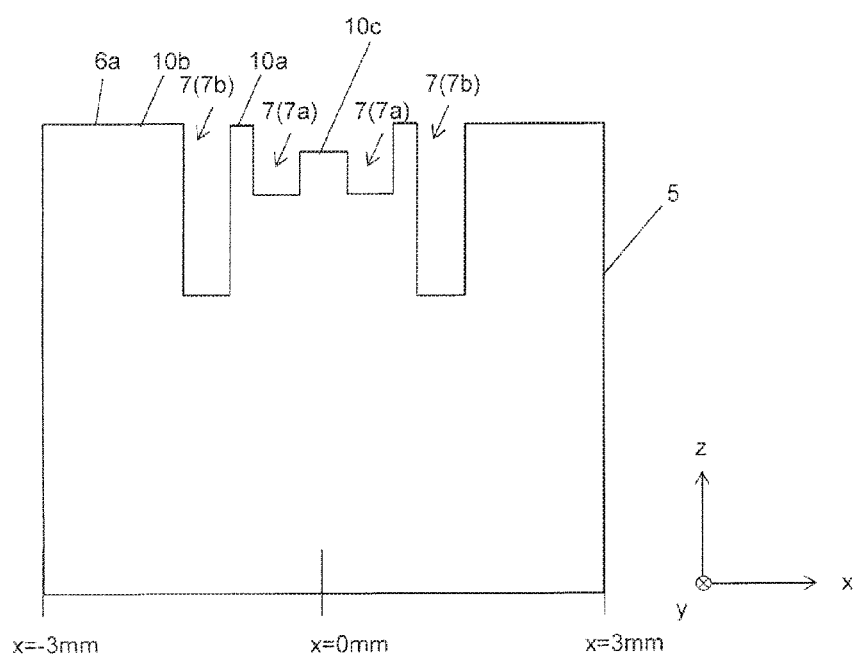
Figure 11B:
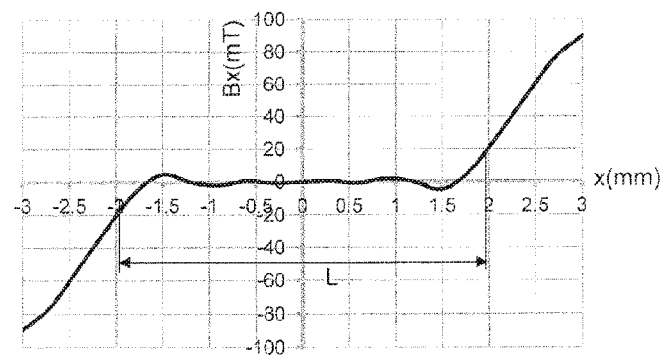

As illustrated in FIG. 10A, second groove 7b may have a larger depth than first groove 7a. Bx can be made flat partly because the gradient of Bx is more likely to be reversed due to protrusions 10a and 10b on both sides of second groove 7b that has stronger characteristics as an independent protrusion and partly because first groove 7a has a small depth. When first groove 7a is too shallow for Bx to be sufficiently made flat, protrusion 10c between first grooves 7a may be formed low, as illustrated in FIG. 11A. In other words, protrusion 10c between two first grooves 7a may terminate behind magnetic pole surface 6a when seen from the bottoms of two first grooves 7a.

As described above, according to the present invention, the bias magnet that has a plurality of grooves can cause Bx to become flat. In addition, the bias magnet that has a plurality of grooves can prevent a reduction of magnetic flux density of the bias magnet in z direction. If the bias magnet has only one groove, as illustrated in FIG. 5A, then the magnetic flux density in the z direction is reduced near the groove. This is because a large groove width must be ensured in order to cause Bx to become flat but, such a large groove width, in turn, reduces the volume of bias magnet around the groove. As a result, only a small change of Bx is obtained when the gear rotates and the possibility that a sufficient output may not be obtained is increased. On the other hand, since a plurality of grooves is provided in the present invention, each groove does not have to be provided with a large groove width. Therefore, a reduction in magnetic flux density in the z direction is limited near each groove and a large change of Bx can be ensured when the gear rotates. The increased change of Bx may be utilized for increasing the output of the magnetic sensor and for widening the space between the gear and the rotation detection apparatus. In particular, the latter advantage results in a larger degree of freedom to arrange the rotation detection apparatus.

The invention claimed is:

1. A magnetic field detection apparatus comprising:
a first magnetic sensor; and
a bias magnet positioned to face the first magnetic sensor, wherein:
the bias magnet has a magnetic pole surface that faces the first magnetic sensor and that applies a bias magnetic field to the first magnetic sensor,
the first magnetic sensor detects magnetic field in a first direction that is parallel to the magnetic pole surface,
the magnetic pole surface of the bias magnet has a plurality of grooves arranged in the first direction,
the plurality of grooves includes two first grooves that are positioned on both sides of a center of the magnetic pole surface with respect to the first direction, and
a protrusion between the two first grooves terminates behind the magnetic pole surface when seen from bottoms of the two first grooves.

2. The magnetic field detection apparatus according to claim 1, wherein the two first grooves are at symmetrical positions with respect to the center of the magnetic pole surface.

3. A magnetic field detection apparatus comprising:
a first magnetic sensor; and
a bias magnet positioned to face the first magnetic sensor, wherein:
the bias magnet has a magnetic pole surface that faces the first magnetic sensor and that applies a bias magnetic field to the first magnetic sensor,
the first magnetic sensor detects magnetic field in a first direction that is parallel to the magnetic pole surface, and
the magnetic pole surface of the bias magnet has a plurality of grooves arranged in the first direction,
the plurality of grooves includes two first grooves that are positioned on both sides of a center of the magnetic pole surface with respect to the first direction,
the plurality of grooves includes two second grooves each positioned outside of the first groove with respect to the first direction, and
the second grooves have smaller depths than the first grooves.

4. The magnetic field detection apparatus according to claim 3, wherein the plurality of grooves includes two third grooves each positioned outside of the second groove with respect to the first direction.

5. A magnetic field detection apparatus comprising:
a first magnetic sensor; and
a bias magnet positioned to face the first magnetic sensor, wherein:
the bias magnet has a magnetic pole surface that faces the first magnetic sensor and that applies a bias magnetic field to the first magnetic sensor,
the first magnetic sensor detects magnetic field in a first direction that is parallel to the magnetic pole surface,
the magnetic pole surface of the bias magnet has a plurality of grooves arranged in the first direction,
the plurality of grooves includes a first groove positioned at a center of the magnetic pole surface with respect to the first direction and two second grooves positioned on both sides of the first groove with respect to the first direction, and
the first groove has a larger dimension in the first direction than the second grooves.

6. A magnetic field detection apparatus comprising:
a first magnetic sensor; and
a bias magnet positioned to face the first magnetic sensor, wherein:
the bias magnet has a magnetic pole surface that faces the first magnetic sensor and that applies a bias magnetic field to the first magnetic sensor,
the first magnetic sensor detects magnetic field in a first direction that is parallel to the magnetic pole surface,
the magnetic pole surface of the bias magnet has a plurality of grooves arranged in the first direction,
the plurality of grooves includes a first groove positioned at a center of the magnetic pole surface with respect to the first direction and two second grooves positioned on both sides of the first groove with respect to the first direction, and
the second grooves have smaller depths than the first groove.

7. The magnetic field detection apparatus according to claim 5, wherein the plurality of grooves includes two third grooves each positioned outside of the second groove with respect to the first direction.

8. A rotation detection apparatus comprising:
the magnetic field detection apparatus according to claim 1; and
a rotatable gear having a tooth on an outer periphery thereof, wherein:
the first magnetic sensor is positioned between the bias magnet and the gear; and
a rotation axis of the gear is parallel to the magnetic pole surface and perpendicular to the first direction.

9. The magnetic field detection apparatus according to claim 3, wherein the two first grooves are at symmetrical positions with respect to the center of the magnetic pole surface.

10. The magnetic field detection apparatus according to claim 6, wherein the plurality of grooves includes two third grooves each positioned outside of the second groove with respect to the first direction.

11. A rotation detection apparatus comprising:
the magnetic field detection apparatus according to claim 3; and
a rotatable gear having a tooth on an outer periphery thereof, wherein:
the first magnetic sensor is positioned between the bias magnet and the gear; and
a rotation axis of the gear is parallel to the magnetic pole surface and perpendicular to the first direction.

12. A rotation detection apparatus comprising:
the magnetic field detection apparatus according to claim 5; and
a rotatable gear having a tooth on an outer periphery thereof, wherein:
the first magnetic sensor is positioned between the bias magnet and the gear; and
a rotation axis of the gear is parallel to the magnetic pole surface and perpendicular to the first direction.

13. A rotation detection apparatus comprising:
the magnetic field detection apparatus according to claim 6; and
a rotatable gear having a tooth on an outer periphery thereof, wherein:
the first magnetic sensor is positioned between the bias magnet and the gear; and
a rotation axis of the gear is parallel to the magnetic pole surface and perpendicular to the first direction.

* * * * *